Aug. 11, 1942.  J. F. O'BRIEN  2,292,394
ELECTRICAL WIRING SYSTEM
Filed Dec. 19, 1939  2 Sheets-Sheet 1
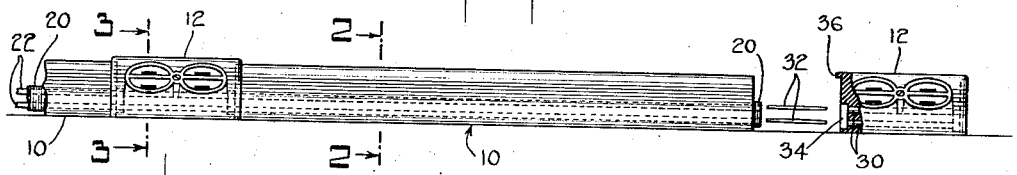
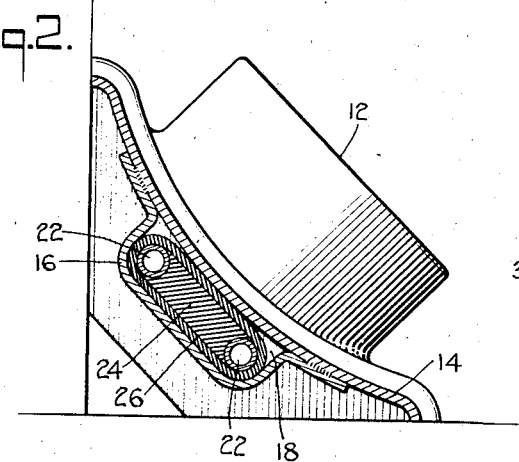
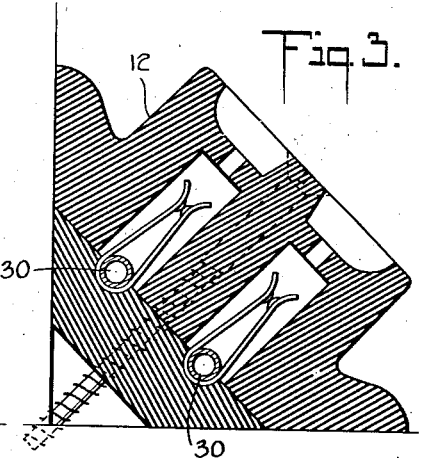
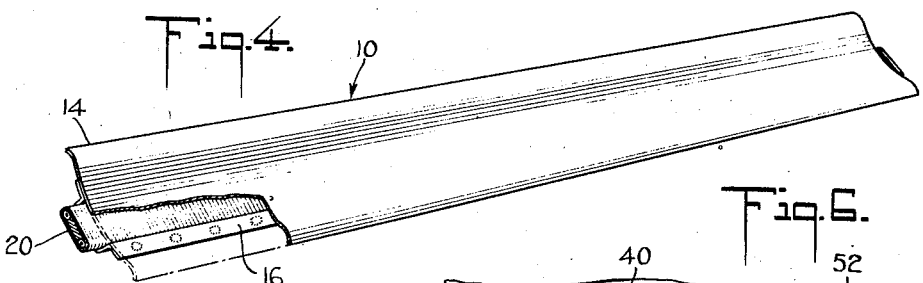
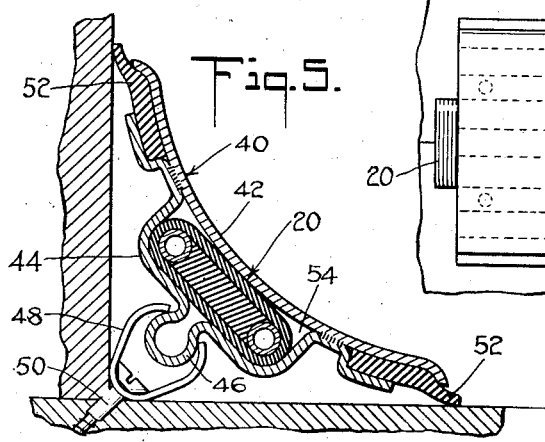
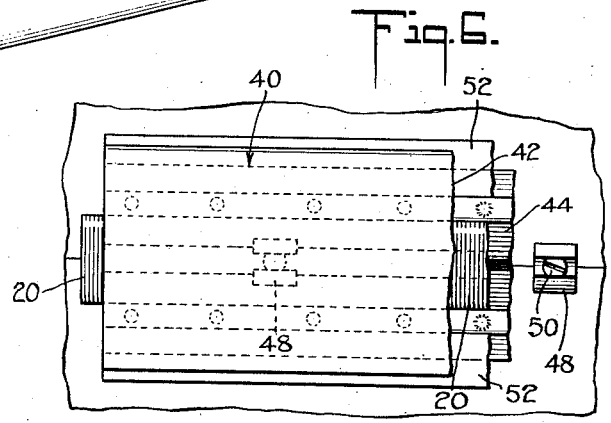
INVENTOR
Joseph F. O'Brien
Henry J. Locke
HIS ATTORNEY Aug. 11, 1942.  J. F. O'BRIEN  2,292,394
ELECTRICAL WIRING SYSTEM
Filed Dec. 19, 1939  2 Sheets-Sheet 2
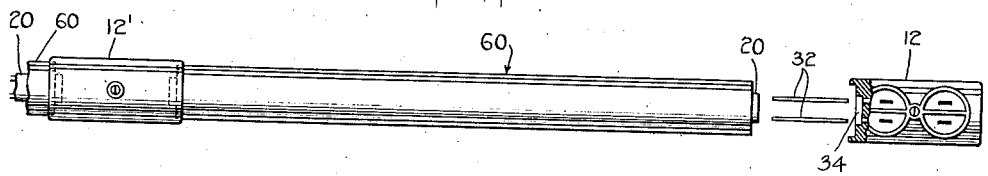
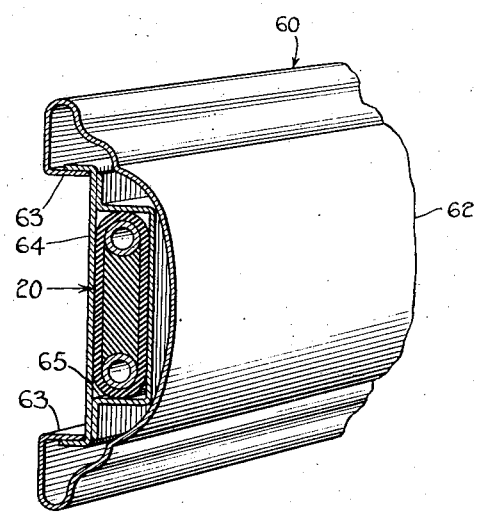
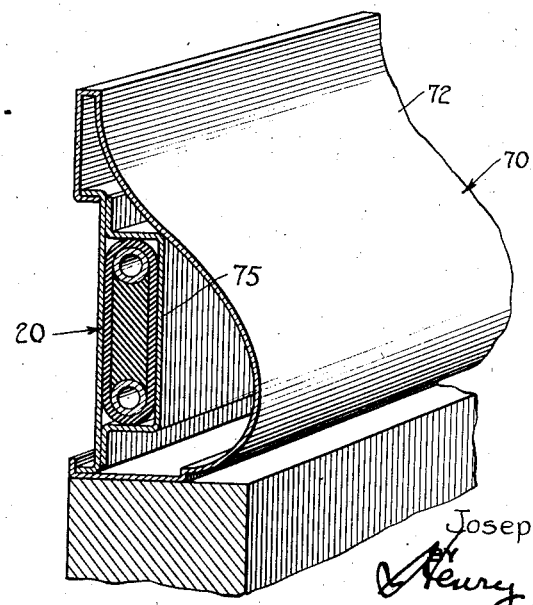
INVENTOR
Joseph F. O'Brien
HIS ATTORNEY Patented Aug. 11, 1942

2,292,394

UNITED STATES PATENT OFFICE 2,292,394

ELECTRICAL WIRING SYSTEM

Joseph F. O'Brien, Jersey City, N. J., assignor to John B. Pierce Foundation, New York, N. Y., a corporation of New York Application December 19, 1939, Serial No. 309,941

5 Claims. (Cl. 173—334.1)

The present invention relates to improvements in electric wiring systems.

In particular, the present invention relates to improved wiring systems embodying "run" units and "connector" units electrically and mechanically interconnected in seriatim, a connector unit being disposed intermediate two run units and thereby affording means of electrically connecting electricity conductors of such run units, and desirably, affording means of securing such run units in desired operative position.

It is an object of the present invention to provide improved run units and connector units for a wiring system of the type stated, the run units being desirably of standardized lengths, and embodying channel means wherein an electricity conductor unit of appropriate length is slidably contained.

It is a further object of the present invention to provide a wiring system comprising run units and therewith assembled connector units which may be readily cut to desired length at the place of installation.

It is a further object of the present invention to provide an improved run unit for a wiring system, such run unit having improved means for securement to a wall surface or the like.

Yet another object of the invention is to provide an improved run unit for an electric wiring system, incorporating means whereby a resilient seal or joint may be effected with the wall surface of a building along which such run units are run, or jointly with two surfaces, such as a wall and floor of a room where the run units are run at the intersection of such wall and floor.

In the present invention the run unit may comprise a housing structure of preferably standard length, desirably of sheet metal or the like, embodying face plate means shaped and decorated as desired, and back plate means positioned in a predetermined location with respect thereto, said back plate means affording a longitudinal channel disposed beneath said facing plate.

Said channel is adapted to accommodate a conductor unit comprising spaced electricity conductors, mutually electrically insulated, and provided with an external insulating covering. Such conductor units are slidably arranged within the stated channel, and project suitably beyond the ends of the housing, such projection being preferably of the order of three-sixteenths of an inch at each end.

Advantageously, the conductors are tubular, of uniform diameter throughout.

For operative association with such run units, connector units are employed. Such connector units may advantageously be formed entirely of electrical insulation material, and incorporate preferably tubular electricity conductors, arranged for registry with the tubular conductors of a run unit. Electrical connection of the respective run unit and connector unit conductors may be made by electrically conductive pins, jumpers, or equivalent.

The connector units are advantageously provided with sockets or recesses for registry with the extending portions of the conductor means of a run unit, whereby such extending portions may project into the body of the connector unit in a male and female engagement. The connector units, further, may be provided with eave-like extensions, the undersurface thereof having a contour matching the external contour of the run units, and adapted thereby to overlie, snugly, the stated run units.

By providing the connector units with means whereby they may be fastened to the building structure, it is apparent that such connector units, through the agency of the stated eave-like extensions, may serve additionally to secure the run units in operative position.

Other features and advantages will hereinafter appear.

In the accompanying drawings:

Fig. 1 is a representation, in elevation, of a portion of an electric wiring system embodying my invention; a portion of the outer sheath of a conductor unit and of a connector unit has been broken away to expose otherwise hidden details;

Fig. 2 is an elevation, taken along the section lines 2—2 of Fig. 1;

Fig. 3 is a section taken through a connector unit on section lines 3—3 of Fig. 1;

Fig. 4 is a perspective view of a conductor unit, a portion of the outer member of which being broken away to expose the conductor means;

Fig. 5 is an end view, in section, of a second form of conductor unit, illustrating a method of securing such unit to a wall or the like;

Fig. 6 is a front elevation of the unit of Fig. 5, elements of such unit having been removed better to show the relationship thereof to the completed structure;

Fig. 7 is a representation of a wiring system comprising run units and connector units of another type; and Figs. 8 and 9 are fragmentary perspectives of a third and fourth form of run units, the run unit shown in Fig. 8 being the type illustrated in Fig. 7.

Referring to Figure 1, a wiring system embodying the present invention comprises a plurality of run units 10, 10, arranged for interconnection by connector units 12, as later described. Advantageously, such connector units embody outlet means, but it will be obvious that the present invention is not restricted to outlet-provided connector units.

Run units 10 are desirably of standardized lengths. It is preferable to make each run unit twelve inches long, such length contemplating that the connector units 12 shall be of the order of four inches in length, whereby the center to center distance between connector units, when arranged in seriatim connection with a run unit, will be of the order of sixteen inches. A wiring system comprising a run unit and therewith associated connector units may, therefore, be secured to studding having a conventional spacing of sixteen inches on centers.

By making the run units 10 of such relatively small length, the seriatim-connected run and connector units are more readily articulated, and are thus more readily conformable to curved or uneven surfaces.

As shown in Figures 1 and 3, a connector unit 12 may have a centrally arranged opening through which a wood screw or like fastening device may be passed for securement to the walls, floors, or studding of a building structure.

Run units 10 are advantageously formed from metallic elements, the external or facing plate 14 thereof being given any desired appearance. For use as shown, namely as a molding disposed at the intersection of the wall or baseboard of a room and the floor of the room, or at the intersection of a wall and counter top, the facing plate 14 may have an outer configuration simulating base molding; as shown in Figure 2, the outer surface of such facing plate 14 may assume an angle of approximately forty-five degrees (45°) with respect to vertical and horizontal planes. Desirably, the marginal edges of such facing strip are turned downwardly to make a neat and substantially snug engagement with the respective vertical and horizontal surfaces representing such wall and floor structure or equivalent.

Operatively associated with said facing plate 14, and advantageously secured thereto by spot welding or the like, there is provided a backing plate unit 16, disposed centrally of said facing plate and running longitudinally thereof. Backing plate means 16 forms a continuous and preferably imperforate pocket 18, coextensive with the facing plate 14, and the respective facing plate and backing plate cooperate to form the "housing" of the run units 10.

Such pocket 18 affords a channel within which a conductor unit 20 may be slidably inserted; the dimensions of conductor unit 20 preferably afford an engagement with the walls of pocket 18 which precludes substantial play or looseness.

In the form shown in Figure 2, such conductor unit 20 embodies any desired plurality of electricity conductors 22, which conductors may advantageously be tubes of copper or equivalent electricity conducting material. Said conductors 22 are maintained in insulated spaced relationship, as by the intermediate insulator 24.

As appears from the drawings, it is preferable to have the opposing lateral edges of the insulator 24 grooved or channeled to form pockets within which such conductors 22 are secured.

For insulating the respective conductors 22 from the facing plate 14 or backing plate 16, an outer sleeve or envelope 26 of electrical insulation material may be employed. It has been found advantageous to form such outer envelop 26 by winding or braiding a continuous tape or fabric formed from glass fiber or the like; such fabric affords excellent insulation qualities, is rot- and vermin-proof, and affords a degree of flexibility to the conductor unit which may not be attained by an envelope of relatively stiffer materials.

Conductor units 20 may be manufactured in any length, and stored on drums, or the like, prior to insertion into the housing.

In completing the manufacture of the run units, conductor units 20 may be slidably inserted into the channel 18, and cut to afford a projection of the order of three-sixteenths of an inch beyond the ends of the run unit housing. As indicated in Fig. 4, each run unit is characterized by electricity conductors which per se afford means adaptable for ready interconnection with the conductors of contiguous units.

As is shown in Figures 1 and 3, the connector unit 12 embodies tubular conductors 30, 30, insulatedly mounted within the body of said unit, and arranged to register with the conductors 22 of a run unit, it being understood that the location of such conductors 30 within the body of unit 12 corresponds to the location of conductors 22 within the unit 10. Electrical connection of the conductors 22 with the connector unit conductors 30 may be effected by any suitable means, such as the illustrated conductive pins 32, Figure 1.

Desirably, the bodies of connector units 12 are wholly of electric insulation material.

Connector units 12 are provided, at their end walls, with recesses 34, such recesses being symmetrical with respect to conductors 30, and having a depth desirably slightly more than the extent of projection of conductor unit 20 from the housing of run unit 10. The dimensions and configuration of such recesses conform to the external dimension and configuration of the outer envelope of such conductor unit 20, whereby, as illustrated in Figure 1, the projecting portion of the conductor unit 20 may be inserted into a recess 34 in male and female joint relationship, to protect the zone of connection of the run unit and the connector unit from damage, short circuiting or the like. As indicated in Fig. 1, an end of the housing of unit 10 abuts against the end wall of unit 12.

Fig. 1 shows also, that connector units 12 are provided, at its end portions, with an eave 36, which overlaps the outer member 14 of the adjacent run unit 10. The configuration of the body portion of the connector 12 and its eave-like extension affords a snug engagement of facing plate 14 and the undersurface of such eave 36, and it being remembered that unit 12 is adapted to be firmly secured in position, the securement of such unit 12 affords securement of the adjacent units 10. Such eave-like extensions additionally shed dirt, water or cleaning fluids.

The embodiment of a run unit illustrated in Figures 5 and 6, incorporates supplemental means for the securement of a run unit, contemplating installations having connector units spaced at relatively great intervals. Such embodiment, also, affords run units which may be adequately secured even though the spacing of studding or the like in a building structure may be irregular.

Such run unit embodiment, designated 40, incorporates a facing plate 42 and a therewith associated backing plate means 44, said backing plate 44 having a longitudinally arranged and preferably centrally disposed bead 46, arranged to cooperate with anchor means 48 and fastening means 50 to secure the run unit 40 in operative position.

As shown, wall portions of bead 46 may lie in substantial parallelism to the surface of backing plate means 44 and in spaced relation thereto, thus affording surfaces engageable by the jaws of anchor means 48. Desirably, said anchor jaws are resilient, thereby affording means whereby the bead 46 may be snapped into engagement with the anchor means.

Figs. 5 and 6 illustrate laterally extending margins 52 of rubber, Thiokol or like synthetic rubber compounds, secured between opposed surfaces of the facing plate 42 and backing plate 44, as shown in Figure 5.

It will be obvious that by suitable proportioning, the marginal members 52 may be urged snugly against the respective vertical and horizontal building elements, to afford a snug, dirt and vermin proof engagement of the run unit with such structural elements.

As shown in Fig. 6, the conductor unit 40 of run unit 40, said unit being slidably arranged within the pocket 54, projects suitably beyond the termini of such run unit.

It will be understood that the run units 40 are intended for installation with connector units 12 as aforesaid. However, in positioning the stated run units 40, the installer may first place and secure the anchor means 48, whereupon the run unit 40 may be secured by snapping the bead 46 thereof into engagement with the jaws of the anchor 48. Such securement is intended primarily to supplement the securement afforded by connector units 12, as previously described.

Figures 8 and 9 illustrate other forms of run units, adaptable for specialized insulations such as chair rails, baseboard molding or the like.

The run units of Figure 8, designated 60, are illustrated in installed status in Figure 7, it being noted that such insulation includes a non-outlet type of connector unit, designated 12'.

The housing of run unit 60 embodies a facing plate 62, having marginal portions turned inwardly to afford tracks or runners 63. The channel providing member may be composite, being advantageously formed from two elements 64, 65, mutually permanently secured as by spot welding or equivalent. A conductor unit 20 is slidably housed within the illustrated pocket afforded by the stated elements 64, 65.

It is to be noted that the composite channel member of the run unit 60 may not be permanently secured to the outer shell 62 thereof. The configuration and positioning of the rail-forming elements 63 insure the proper position of the channel forming member, and additionally, the corners of such composite channel forming member may engage the undersurface of facing plate 62. The accurate positioning thereby afforded such channel member assures that the conductor unit 20 of a run unit will register with the conductors of a connector unit.

In the structure illustrated in Figure 9, a generally similar method of construction may be employed. The outer shell member 72 of run unit 70 has configurated marginal surfaces which afford the desired "track" along which the channel forming elements may be moved. In such construction, a resilient engagement is had between the outer shell member 72 and the member 75 forming an element of the channel-providing section, such resilient engagement serving to rotate the stated channel forming section clockwise, thus forcing the lower flange of such channel forming section into engagement with the "track" provided at the lower surface of such unit 72, and maintaining the proper position of conductor unit 20 therein.

A feature of the present invention is the adaptability of the run unit for foreshortening to meet the requirements of an insulation.

To shorten a run unit 10, it is necessary only to withdraw the conductor unit 20 therefrom to an amount suitably greater than the amount which is to be cut off of the conductor unit. Thereupon any suitable amount may be severed from the housing of the conductor unit, as by a hack saw or like available tool. After the housing portion of the run unit has been cut to desired length, the conductor unit thereof may be cut so that such conductor means will be three-eighths of an inch longer than the new length of the run unit, whereupon the conductor means may be slid back into its operative position, in which position the conductor unit extends three-sixteenths of an inch from each end of the run unit housing.

Whereas I have described my invention by reference to specific forms thereof, it will be understood that many changes and modifications may be made without departing from the spirit of the invention.

I claim:

1. A conductor unit for a wiring system, comprising face plate means simulating building molding, backing plate means of channel form secured to the under side thereof and providing a continuous substantially rectangular pocket extending longitudinally of said facing plate means at substantially the median line thereof, a strip of resilient material disposed at the lateral marginal edges of said face plate means and extending outwardly therefrom, and electricity conductor means slidably housed within said substantially rectangular pocket means and engaged by the walls thereof to prevent other than longitudinal movement therein, said conductor means being of predetermined length to afford a desired degree of extension from the face plate means at the ends thereof.

2. A conductor unit for a wiring system, including the combination with face plate means simulating building molding, channel-shaped backing plate means secured to an under side of said face plate means and extending longitudinally thereof to provide a substantially rectangular continuous pocket, said backing plate means, further having a non-deformable, longitudinal bead disposed at substantially the median line of said face plate means, and electricity conductors mutually insulated within a common housing slidably positioned within said pocket and engaging wall surfaces thereof to restrain displacement other than in a longitudinal direction, of anchor means arranged for securement to said building structure and releasably engageable with said laterally extending bead to secure said unit to said building structure.

3. A combined molding and electricity conductor unit, comprising a facing plate simulating building molding and having edge portions adapted to fit snugly against vertical and horizontal wall surfaces adjacent the intersection thereof and defining with said wall surfaces, a substantially triangular space, a channel-like backing strip secured to the under side of said facing plate and extending longitudinally thereof along substantially the median line of such facing plate, said backing strip cooperating with said facing plate to form an enclosed substantially rectangular passage, and conductor means including a plurality of conductors disposed in fixed mutually spaced insulated relationship disposed within a common casing having a dimension approximating the dimension of said enclosed passage and having outer surfaces engaging with the angularly disposed walls thereof to secure said conductor means against displacement, said conductor means projecting from an end of said facing plate.

4. A combined molding and electricity conductor unit comprising the combination with a facing plate configurated to simulate structural molding, said facing plate having an edge formation adapted to snugly engage the walls of a room and defining with such wall, an enclosure of substantial volume, a backing plate of less width than the facing plate secured to said facing plate to provide an enclosed substantially rectangular passage disposed within the enclosure defined by the facing plate and the wall, said passage having a width less than the width of the facing plate and extending longitudinally of said facing plate in predetermined position relative thereto, and a conductor containing core unit having electricity conductors disposed therein in fixed mutually insulated spaced relationship, said core unit being removably positioned within said passage in engagement with the walls thereof to preclude displacement except longitudinally of the unit to position the conductors of said core unit in uniform location relative to the unit throughout the length thereof.

5. A combined molding and electricity conductor unit, comprising a facing plate simulating building molding and having edge portions adapted to fit snugly against vertical and horizontal wall surfaces adjacent the intersection thereof and defining with said wall surfaces, a substantially triangular space, a channel-like backing strip secured to the under side of said facing plate and extending longitudinally thereof along substantially the median line of such facing plate, said backing strip cooperating with said facing plate to form an enclosed substantially rectangular passage, and conductor means including a plurality of conductors disposed in fixed mutually spaced insulated relationship disposed within a common casing having a dimension approximating the dimension of said enclosed passage and having outer surfaces engaging with the angularly disposed walls thereof to secure said conductor means against displacement.

JOSEPH F. O'BRIEN.